(12) United States Patent
Diosady et al.

(10) Patent No.: US 12,595,749 B1
(45) Date of Patent: Apr. 7, 2026

(54) OIL SYSTEM FOR AIRCRAFT ENGINE HAVING FEATURES TO PREVENT DRAINAGE OF COMPONENT

(71) Applicant: PRATT & WHITNEY CANADA CORP., Longueuil (CA)

(72) Inventors: Laslo Tibor Diosady, Etobicoke (CA); Hugues Pellerin, Montréal (CA); Rose Beaulieu, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/955,079

(22) Filed: Nov. 21, 2024

(51) Int. Cl.
*F01D 25/18* (2006.01)
*F02C 7/06* (2006.01)

(52) U.S. Cl.
CPC ................ *F01D 25/18* (2013.01); *F02C 7/06* (2013.01); *F05D 2260/98* (2013.01)

(58) Field of Classification Search
CPC ............. F03C 7/06; F01D 25/18; F01D 25/20
See application file for complete search history.

(56) References Cited

U.S. PATENT DOCUMENTS

| | | | |
|---|---|---|---|
| 10,196,926 B2 | 2/2019 | Ketchum et al. | |
| 10,711,644 B2 | 7/2020 | Avis et al. | |
| 10,961,868 B2 | 3/2021 | Avis et al. | |
| 2006/0075754 A1* | 4/2006 | Champion | F02C 7/36 60/772 |
| 2007/0137932 A1* | 6/2007 | Smith | F01D 25/18 184/6 |
| 2014/0331639 A1 | 11/2014 | Raimarckers et al. | |
| 2016/0202709 A1 | 7/2016 | Newman | |
| 2017/0002824 A1* | 1/2017 | Hiwata | F04D 29/061 |
| 2017/0022906 A1* | 1/2017 | Lepage | F02C 7/232 |
| 2017/0234158 A1* | 8/2017 | Savela | F01D 25/164 416/1 |
| 2017/0350274 A1* | 12/2017 | Snyder | F01D 25/24 |
| 2018/0306062 A1* | 10/2018 | Avis | F01M 1/02 |
| 2019/0292944 A1* | 9/2019 | Mason | F01M 1/02 |
| 2019/0316488 A1* | 10/2019 | Menczykalski | F01D 25/20 |
| 2021/0148283 A1* | 5/2021 | Niergarth | F02C 7/185 |
| 2024/0328352 A1* | 10/2024 | Pellerin | F01M 11/0004 |
| 2024/0410398 A1* | 12/2024 | Shah | F02C 7/06 |

* cited by examiner

*Primary Examiner* — Katheryn A Malatek
(74) *Attorney, Agent, or Firm* — NORTON ROSE FULBRIGHT CANADA LLP

(57) ABSTRACT

An aircraft engine having a centerline, has: an oil system including: a component located above the centerline and having an inlet and an outlet; an oil circuit interconnecting the components and including an input line connected to the inlet and an output line connected to the outlet, the input line defining an input U-shaped section, the output line defining an output U-shaped section; a valve connected on the input line or the output line and located between the component and a respective one of the input U-shaped section and the output U-shaped section; and an anti-siphon line connecting the input line to the output line and defining a flow path of a lesser flow circulating area of the input line and the output line, the input U-shaped section, the output U-shaped section, and the component located between connection points defined between the anti-siphon line and the input and output lines.

18 Claims, 4 Drawing Sheets

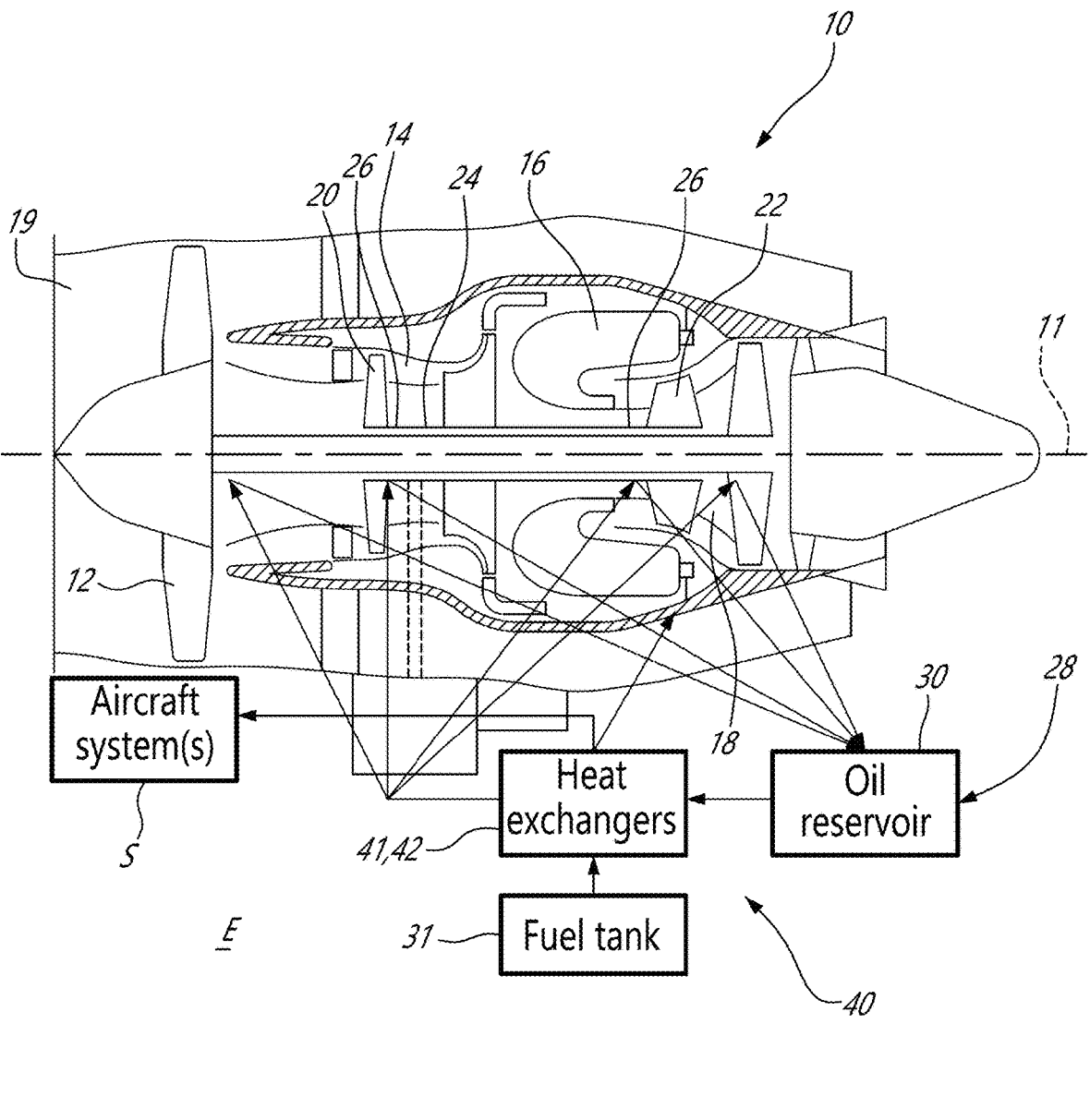
_FIG. 1_

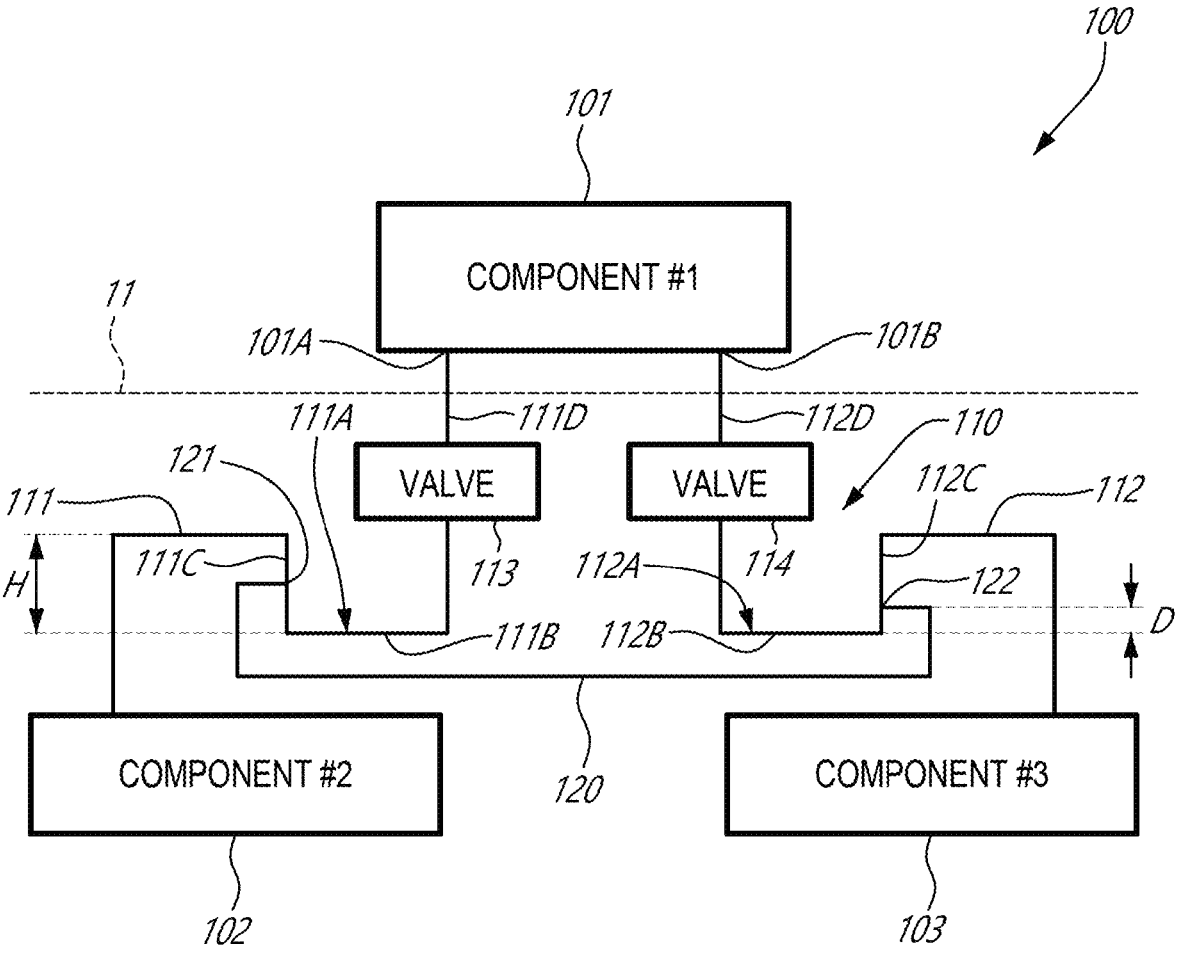
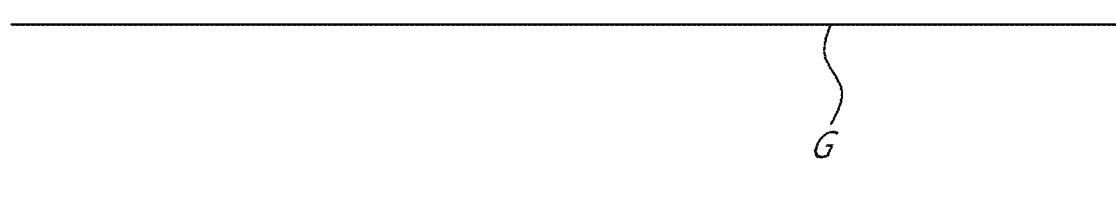

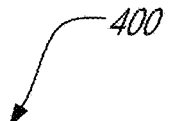

Limit the oil from flowing out of the component via one of the input and output lines with a valve fluidly connected on the one of the input and output lines ~*402*

Limit an oil flow from the component from reaching other components of the engine with U-shaped sections defined by both of the input and output lines ~*404*

Prevent air from reaching the component using an anti-siphon line that fluidly connects the input line to the output line while bypassing the U-shaped sections, the anti-siphon line having a reduced flow circulating area compared to that of the input and output lines. ~*406*

*4*

OIL SYSTEM FOR AIRCRAFT ENGINE HAVING FEATURES TO PREVENT DRAINAGE OF COMPONENT

TECHNICAL FIELD

The disclosure relates generally to aircraft engines and, more particularly, to systems and methods used to prevent oil from draining out of components from such engines during engine shut down.

BACKGROUND

Aircraft engines use oil systems to distribute oil to components in need of oil for their operation. Such components include, for instance, bearings, heat exchangers, gearboxes, actuators, oil filters, and so on. Such an aircraft engine heat exchanger may include an air-cooled oil cooler (ACOC), which is used to cool oil with ambient air, and a fuel-oil heat exchanger (FOHE), sometimes referred to as a fuel/oil cooler, which is typically used to simultaneously heat the fuel prior to its injection into a combustion chamber and to cool oil in the oil system. These components may hold a substantial volume of oil during operation. Existing oil systems and their associated components are satisfactory for their intended purposes, but there remain a need for improvement.

SUMMARY

In one aspect, there is provided an aircraft engine having a centerline, comprising: an oil system including: a component located above the centerline and having an inlet and an outlet; an oil circuit fluidly interconnecting the components, the oil circuit including an input line fluidly connected to the inlet and an output line fluidly connected to the outlet, the input line defining an input U-shaped section, the output line defining an output U-shaped section; a valve fluidly connected on the input line or the output line, the valve located between the component and a respective one of the input U-shaped section and the output U-shaped section; and an anti-siphon line fluidly connecting the input line to the output line, the anti-siphon line defining a flow path of a lesser flow circulating area of the input line and the output line, the input U-shaped section, the output U-shaped section, and the component located between connection points defined between the anti-siphon line and the input and output lines.

The aircraft engine described above may include any of the following features, in any combinations.

In some embodiments, the valve is located on the output line.

In some embodiments, the valve is one of two valves, each of the two valves fluidly connected to a respective one of the input line and the output line.

In some embodiments, each of the two valves is located between the component and a respective one of the input U-shaped section and the output U-shaped section.

In some embodiments, the two valves are located closer to the component than the connection points of the anti-siphon line.

In some embodiments, the component is an air-cooled oil cooler.

In some embodiments, the flow circulating area of the anti-siphon line is selected such that a pressure drop of an oil flow through the anti-siphon line while the aircraft engine is running is greater than a pressure drop through the component.

In some embodiments, the flow circulating area of the anti-siphon line is at most 5% of that of the input and output lines.

In some embodiments, the anti-siphon line is connected to both of the input line and the output line at respective input and output connection points, a distance along a direction perpendicular to a ground between each of the input and output connection points and a respective one of lowest points of the input and output U-shaped sections being at least three times a diameter of a respective one of the input and output lines.

In another aspect, there is provided an oil system for an aircraft engine, comprising: a component located above a central axis of the aircraft engine, the component containing a volume of oil during operation of the aircraft engine, the component having an inlet and an outlet; an oil circuit fluidly connected to the component, the oil circuit including an input line fluidly connected to the inlet and an output line fluidly connected to the outlet, the input line defining an input U-shaped section, the output line defining an output U-shaped section; a valve fluidly connected on the input line or the output line, the valve located between the component and a respective one of the input U-shaped section and the output U-shaped section; and an anti-siphon line fluidly connecting the input line to the output line while bypassing the input U-shaped section and the output U-shaped section, a flow circulating area of the anti-siphon line being less than that of the input line and of the output line.

The oil system described above may include any of the following features, in any combinations.

In some embodiments, the valve is located on the output line.

In some embodiments, the valve is one of two valves, each of the two valves being fluidly connected to a respective one of the input line and the output line.

In some embodiments, each of the two valves is located between the component and a respective one of the input U-shaped section and the output U-shaped section.

In some embodiments, the two valves are located closer to the component than the connection points of the anti-siphon line.

In some embodiments, the component is an air-cooled oil cooler.

In some embodiments, the flow circulating area of the anti-siphon line is selected such that a pressure drop of an oil flow through the anti-siphon line while the aircraft engine is running is greater than a pressure drop through the component.

In some embodiments, the flow circulating area of the anti-siphon line is at most 5% of that of the input and output lines.

In some embodiments, the anti-siphon line is connected to both of the input line and the output line at respective input and output connection points, a distance along a direction perpendicular to the central axis between each of the input and output connection points and a respective one of lowest points of the input and output U-shaped sections being at least three times a diameter of a respective one of the input and output lines.

In yet another aspect, there is provided a method of mitigating oil leakage from a component during engine shutdown, the component fluidly connected to an oil system of the engine via input and output lines, the method comprising: limiting the oil from flowing out of the component via one of the input and output lines with a valve fluidly connected on the one of the input and output lines; limiting an oil flow from the component from reaching other components of the engine with U-shaped sections defined by both of the input and output lines; and preventing air from reaching the component using an anti-siphon line that fluidly connects the input line to the output line while bypassing the U-shaped sections, the anti-siphon line having a reduced flow circulating area compared to that of the input and output lines.

In some embodiments, the preventing of the air from reaching the component via the anti-siphon line includes flowing the air through the anti-siphon line having the flow circulating area selected such that the anti-siphon line offers a greater flow resistance to an oil flow than the component.

DESCRIPTION OF THE DRAWINGS

Reference is now made to the accompanying figures in which:

FIG. 1 is a schematic cross sectional view of an aircraft engine depicted as a gas turbine engine;

FIG. 3 is a schematic view of a portion of the oil system of FIG. 2; and

FIG. 4 is a flowchart illustrating steps of a method for mitigating oil leakage from a component of the oil system of FIG. 2 during engine shutdown.

DETAILED DESCRIPTION

Figure 2:
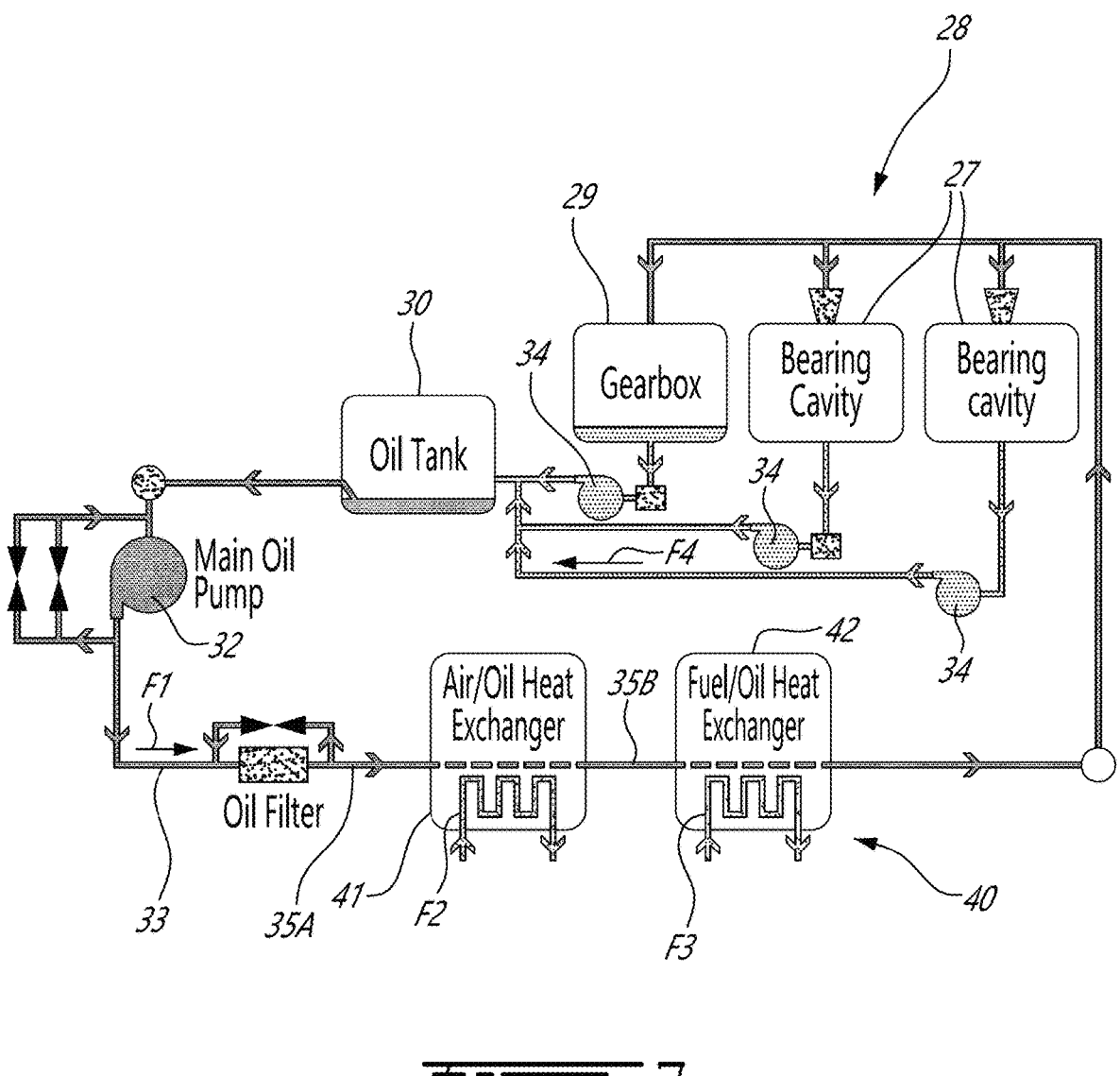
FIG. 2 is a schematic view of an oil system of the aircraft engine of FIG. 1.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. More specifically, the gas turbine engine 10 has a core gas path including an intake 19 for receiving air. The compressor section 14 has at least one compressor 20 extending across the core gas path and the turbine section 18 has at least one turbine 22 extending across the core gas path, with the at least one compressor 20 and the at least one turbine 22 being rotatable with a rotary shaft 24 supported within the gas turbine engine 10 by bearings 26. The bearings 26 may be contained within bearing cavities 27 (FIG. 2) that may be hydraulically connected to an oil source to receive oil for lubrication. An oil system 28 is provided for circulating oil to the bearings 26 and back to an oil reservoir 30. It will be appreciated that the principles of the disclosure apply to any aircraft engines, such as internal combustion engines (e.g., piston engine, rotary engine), any type of gas turbine engines, (e.g., turbofan, turboshaft, and turboprop), and auxiliary power unit.

In the embodiment shown, the gas turbine engine 10 has a heat exchange system 40 that is used to exchange heat between different fluids for proper operation of the gas turbine engine 10. In the present case, the heat exchange system 40 includes a first heat exchanger 41, which may be referred to as a air-cooled oil cooler (ACOC), which is used to transfer heat from the oil to an environment E outside the gas turbine engine 10. The heat exchange system 40 further includes a second heat exchanger 42, which may be referred to as a fuel-oil heat exchanger (FOHE), used for transferring heat from the oil of the oil system 28 to fuel flowing from a fuel reservoir 31, or any other fuel source, to the combustor 16 of the gas turbine engine 10 for combustion. Pre-heating the fuel as such may increase efficiency of the combustion of the fuel and may cool down the oil that heats up while lubricating the bearings 26. In some cases, the first heat exchanger 41 may be used to transfer or extract heat to/from an aircraft system S in need.

Referring to FIG. 2, the oil system 28 and the heat exchange system 40 are shown in greater detail. The oil system 28 includes an oil pump 32 that drives an oil flow F1 within an oil conduit 33 from the oil reservoir 30. The oil system 28 may be a pressure regulated system in which a pressure regulating valve may be connected in parallel to the oil pump 32. The oil flow F1 exchanges heat with an airflow F2 through the first heat exchanger 41 and exchanges heat with a fuel flow F3 through the second heat exchanger 42. The oil flow F1 is then distributed between different components in need of oil. These components may include, for instance, one or more bearing cavity(ies) 27 and/or a gearbox 29 in some embodiments. Used oil is then scavenged and scavenge pumps 34 drive a scavenge oil flow F4 from scavenge outlets of the bearing cavities 27 and the gearbox 29 back to the oil reservoir 30 where the oil may be flown back to the oil pump 32. A de-oiler and/or de-aerator may be used to remove air from the scavenge oil flow F4.

In use, a significant volume of oil is contained in the heat exchangers and associated oil lines. The oil system may be required to ensure that the oil remains in the heat exchangers during and after engine shut down to avoid the oil from escaping the heat exchangers and flooding the gas turbine engine 10. It will be appreciated that the principles of the present disclosure may apply to any fluid system and to any component containing a volume of a fluid. For instance, the component may be a gearbox, a filter, a heat exchanger, an actuator, and so on.

Referring to FIG. 3, a portion of the oil system 28 is shown at 100 and includes a first component 101, a second component 102, and a third component 103. The components are interconnected together via an oil circuit 110. The second component 102 may be located upstream of the first component 101 while the third component 103 may be located downstream of the first component 101 relative to an oil flow through the first component 101. The first component 101 may be the ACOC, any heat exchanger, actuator or any component that contains a volume of oil during operation as aforementioned. The second and third components 102, 103 may be an oil pump, a gearbox, a bearing cavity, an oil tank, a scavenge pump, and so on.

As shown in FIG. 3, the first component 101 is located at a higher elevation relative to a ground G than the second and third components 102, 103. It will be appreciated that the elevation is measured when an aircraft equipped with the gas turbine engine 10 is levelled relative to the ground G whether or not it is flying or on the ground. The first component 101 may be above a centerline or central axis 11 of the gas turbine engine 10. The first component 101 may be above component 102 and 103, and be either the highest point in the oil system 28 or be a local extremum. Therefore, oil may tend to flow downwardly, by gravity, when no force is exerted to keep the oil in the first component 101. In other words, when shutting down the gas turbine engine 10, the pump driving the oil flow through the oil circuit 110 stops. Air may infiltrate in the oil circuit 110 and make its way up to reach the first component 101. At which point, the air may start replacing the oil in the first component 101 thereby allowing the oil to flow out of the first component 101. This may cause the oil to flood other components, such as the bearing cavities. Alternatively, at shut-down, the pump 32 could stop feeding the oil system while the scavenge pumps 34 remain operative, either with a valve or a specific shut-down procedure. This would avoid flooding, but requires an oil tank 30 big enough to house all of the oil contained in the first component 101. Increasing the volume of the tank is not a desired option for weight concerns. Additionally, a system allowing the first component 101 to drain at shutdown would take longer to prime at start-up than a system that does not since the oil needs to fill the first component 101 before reaching the components in need of oil located downstream of the first component 101. This may be undesirable.

The oil system 100 may include features that may alleviate the above-mentioned drawbacks. As will be discussed, the oil system 100 includes three features to mitigate oil leakage out of the first component 101: U-shaped sections or "traps"; valve(s); and an anti-siphon conduit. These features may provide redundancy to each other to help in avoiding oil from flooding other components of the gas turbine engine 10.

Still referring to FIG. 3, the first component 101 has an inlet 101A and an outlet 101B. The second component 102 is fluidly connected to the first component 101 via an input line 111 of the oil circuit 110. The first component 101 is fluidly connected to the third component 103 via an output line 112 of the oil circuit 110. The input line 111 defines an input U-shaped section 111A while the output line 112 defines an output U-shaped section 112A. Each of the input and output U-shaped sections 111A, 112A includes a lowest point 111B, 112B that corresponds to a location where an elevation of the U-shaped sections relative to the ground G is minimal. The U-shaped sections may also be referred to as S-traps or P-traps and are used to ensure that, at equilibrium, the atmospheric pressure balances the hydrostatic pressure to ensure that oil remains within the first component 101. In other words, these U-shaped sections are used to enclose a volume of oil such that ambient pressure opposes the head of oil generated by the height difference of the first component 101 therefore opposing a flow of oil whether it be via the inlet 101A or the outlet 101B.

Put differently, the input U-shaped sections 111A, 112A have first portions 111C, 112C and second portions 111D, 112D disposed on opposite sides of the lowest point 111B, 112B. The second portions 111D extend from the lowest points 111B, 112B to the first component 101. The first portions 111C, 112C have a height H that extends from the lowest point 111B, 112B to a top sections of the conduits 111, 112. Similarly, the second portions 111D, 112D have a second height that extends from the lowest points 111B, 112B to the first component 101. The second height is greater than the height H. At equilibrium, the most of the first component 101, and all of the second portions 111D, 112D and the first sections 111C, 112C will be filled with oil. There may be a small amount of air at the top of the first component 101 that was able to enter during the transient shutdown. Oil will fill the first portions 111C, 112C to an intermediary height being less than the height H. The oil remains within the first component 101 and the lines 111, 112 since the hydrostatic pressure due to the difference in the height H and the intermediary height is balanced by the atmospheric pressure in the first portions 111C, 112C.

It is to be understood that the previous paragraph describes the desired equilibrium state of the oil system. The purpose of the other features described in the following paragraphs are to ensure that the equilibrium point is actually reached during a shutdown procedure starting from a situation where the engine is operating and oil is flowing through the components from the second component 102, to the first component 101, and then to the third component 103.

Upon engine shutdown, the pumps no longer circulate oil through the oil system and the motion of oil is primarily driven as a result of gravity. At the seals the pressure reverts to atmospheric pressure and the hydrostatic pressure drives a flow from the higher openings towards lower openings. For example if the second component 102 is connected to a seal at an elevation higher than the third component 103, the oil will flow from the second component 102 to the first component 101 then to the third component 103 potentially draining all of the oil from the first component 101 before a hydrostatic equilibrium is reached.

Thus, when the engine is either shutting down or inoperative and the second and third components 102, 103 have drained, both U-shaped sections 111A, 112A create a stable equilibrium of hydrostatic pressure continuum from 111C to 112C preventing the first component 101 from draining. The valves provide stability on the short term, the anti-siphon on the medium term and the U sections on the long term.

It may be understood that at equilibrium the pressures at 111C and 112C must match. It was suggested that this was atmospheric pressure, though in practice an equilibrium position is reached if the pressures at 111C and 112C match (as are sufficient to overcome the hydrostatic pressure of the oil). Thus, to limit the first component 101 from draining its oil into other components of the oil system 100, the system 100 includes an anti-siphon line 120 fluidly connecting the input line 111 to the output line 112 while bypassing the input U-shaped section 111A and the output U-shaped section 112A. Understandably, a flow circulating area of the anti-siphon line 120 is less than that of the input line 111 and of the output line 112 to avoid the oil from bypassing the first component 101 during normal operation of the gas turbine engine 10. In other words, the anti-siphon line 120 is configured to exert a greater resistance to the oil than the first component 101. To this end, the flow circulating area of the anti-siphon line 120 is selected such that a pressure drop of an oil flow through the anti-siphon line 120 while the aircraft engine is running is greater than a pressure drop through the first component 101. The flow circulating area may be, in some embodiments, at most 5% that of the input and output lines 111, 112. The anti-siphon line 120 defines a flow path. The input U-shaped section 111A, the output U-shaped section 112A, and the first component 101 are located between connection points 121, 122 defined between the anti-siphon line 120 and the input and output lines 111, 112.

The anti-siphon line 120 provides an alterative path to air flowing from one or both of the second and third components 102, 103 towards the first component 101, which is at a higher elevation. When the air reaches either of the first and second connection points 121, 122, the air may tend to flow into the anti-siphon line rather than continuing its path towards the first component 101. The anti-siphon line 120 may thus equilibrate pressure between 111C and 112C thereby limiting the amount air reaching the first component 101 prior to an equilibrium point being reached. This may contribute in keeping the oil in the first component 101 and limiting the oil from draining out of the first component 101.

To further ensure that the system reaches equilibrium before oil drains from the first component 101, one or more valve, two valves in the embodiment shown, are fluidly connected on the input line 111 and output line 112. The valves include a first valve 113 fluidly connected on the input line 111 between the input U-shaped section 111A and the inlet 101A of the first component 101, and a second valve 114 fluidly connected on the output line 112 between the output U-shaped section 112A and the outlet 101B of the first component 101. These valves may be located at other locations along the input and output lines. The valves are located closer to the first component 101 than the connection points 121, 122 of the anti-siphon line. Only one of the two valves may be used. Typically, if only one valve is used, it will be located on the side to which the oil is likely to drain upon shutdown. The single valve may be located on the line from which a transient pressure wave such as a fluid hammer may come. The valve is a device which function is to prevent oil from flowing in a direction opposite to the normal operation direction, hence further preventing the first component 1 from draining. One or both of the valves may be replaced by a pump in some embodiments, which restricts the flow when the gas turbine engine 10 is not rotating. Any suitable means able to limit an oil flow may be used. The valves may be, for instance, poppet, spool, ball, flapper valves in some embodiments.

The purpose of the valves is to ensure that when the valve is closed, more pressure is required to drive flow through the path defined by 111B, 111D through the first component 101, and through 112D, 112B relative to driving flow through the anti-siphon line 120, such that flow (of eventually air) will preferentially go through the anti-siphon line 120 as opposed to the first component 101.

In the context of the present disclosure, expressions "upstream" and "downstream" are in relation to a flow of oil in the oil system during normal operation of the gas turbine engine 10, and expressions "lowest" and "highest" relate to the elevation relative to the ground G when the gas turbine engine 10 is levelled relative to the ground G.

To further mitigate oil leakage, one or more valve, two valves in the embodiment shown, are fluidly connected on the input line 111 and output line 112. The valves include a first valve 113 fluidly connected on the input line 111 between the input U-shaped section 111A and the inlet 101A of the first component 101, and a second valve 114 fluidly connected on the output line 112 between the output U-shaped section 112A and the outlet 101B of the first component 101. These valves may be located at other locations along the input and output lines. Only one of the two valves may be used. Typically, if only one valve is used, it will be located on a low pressure side of the first component 101. For instance, the pressure at the outlet 101B of the first component 101 may be less than that at the inlet thereof. Hence, the valve may be located only on the output line 112 since oil may tend to flow towards where the pressure is lower. One or both of the valves may be replaced by a pump in some embodiments, which restricts the flow when the gas turbine engine 10 is not rotating. Any suitable means able to limit an oil flow may be used. The valves may be, for instance, poppet, spool, ball, flapper valves in some embodiments.

In some embodiments, some oil may flow past those valves. Thus, to further limit the first component 101 from draining its oil into other components of the oil system 100, the system 100 includes an anti-siphon line 120 fluidly connecting the input line 111 to the output line 112 while bypassing the input U-shaped section 111A and the output U-shaped section 112A. Understandably, a flow circulating area of the anti-siphon line 120 is being less than that of the input line 111 and of the output line 112 to minimize a fraction of the oil bypassing the first component 101 during normal operation of the gas turbine engine 10. In other words, the anti-siphon line 120 is configured to exert a greater resistance to the oil than the first component 101. To this end, the flow circulating area of the anti-siphon line 120 is selected such that a pressure drop of an oil flow through the anti-siphon line 120 while the aircraft engine is running is greater than a pressure drop through the first component 101. The flow circulating area may be, in some embodiments, at most 5% that of the input and output lines 111, 112. The anti-siphon line 120 defines a flow path. The input U-shaped section 111A, the output U-shaped section 112A, and the first component 101 are located between connection points 121, 122 defined between the anti-siphon line 120 and the input and output lines 111, 112.

In the embodiment shown, the anti-siphon line 120 is connected to both of the input line 111 and the output line 112 at respective input and output connection points 121, 122. The valves are located closer to the first component 101 than the connection points 121, 122 of the anti-siphon line. A distance D along a direction perpendicular to the ground G or perpendicular to the central axis 11 between each of the input and output connection points 121, 122 and a respective one of the lowest points 111B, 112B of the input and output U-shaped sections 111A, 112A is at least three times a diameter of a respective one of the input and output lines 111, 112. The diameter may be a hydraulic diameter in case these lines are not circular. The hydraulic diameter may be computed by multiplying the cross-sectional area of the line by four and dividing the resultant by the perimeter of the line.

The anti-siphon line 120 provides an alterative path to air flowing from one or both of the second and third components 102, 103 towards the first component 101, which is at a higher elevation. Put differently, if the anti-siphon line 120 were absent, if, during or after engine shutdown, air is introduced in the oil system, it will tend to flow upwardly towards the first component 101. When the air reaches either of the first and second connection points 121, 122, the air may tend to flow into the anti-siphon line rather than continuing its path towards the first component 101. The anti-siphon line 120 may thus equilibrate pressure between the inlet 101A and the outlet 101B of the first component 101. In combination with the valve(s), the anti-siphon line 120 thereby limits air from reaching the first component 101. This may contribute in keeping the oil in the first component 101 and limiting the oil from draining out of the first component 101.

The valve's function is to prevent oil from being pushed out from the first component 101 on a short time scale. The anti-siphon line's function is to equalize the pressure on both lines 111 and 112 on the medium time scale.

Referring now to FIG. 4, a method for mitigating oil leakage from a component of the oil system of FIG. 2 during engine shutdown is shown at 400.

The method 400 includes limiting the oil from flowing out of the first component 101 via one of the input and output lines 111, 112 with the valve(s) 113, 114 fluidly connected on the one of the input and output lines 111, 112 at 402; limiting an oil flow from the first component 101 from reaching other components of the engine with U-shaped sections 111A, 112A defined by both of the input and output lines 111, 112 at 404; and preventing air from reaching the first component 101 via the anti-siphon line 120 that fluidly connects the input line 111 to the output line 112 while bypassing the U-shaped sections 111A, 112A.

In some embodiments, the limiting of the oil from flowing out of the first component 101 with the valve 113, 114, includes limiting the oil from flowing out of the first component 101 with the valve 114 being located on the output line 112.

In some embodiments, the limiting of the oil from flowing out of the first component 101 with the valve 113, 114 includes limiting the oil from flowing out of the component with the two valves first each connected on a respective one of the input and output lines 111, 112.

In some embodiments, the limiting the oil from flowing out of the first component 101 with the two valves 113, 114 includes limiting the oil from flowing out of the first component 101 with the two valves 113, 114 each being located between the first component 101 and a respective one of the U-shaped sections 111A, 112A.

In some embodiments, the preventing of the air from reaching the first component 101 with the anti-siphon line 120 includes flowing the air through the anti-siphon line 120 having the flow circulating area being at most 5% that of the input and output lines 111, 112.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine having a centerline, comprising:
   an oil system including:
   a component located above the centerline and having an inlet and an outlet;
   an oil circuit fluidly connected to the component, the oil circuit including an input line fluidly connected to the inlet and an output line fluidly connected to the outlet, the input line defining an input U-shaped section, the output line defining an output U-shaped section;
   a valve fluidly connected on the input line or the output line, the valve located between the component and a respective one of the input U-shaped section and the output U-shaped section; and
   an anti-siphon line fluidly connecting the input line to the output line, the anti-siphon line defining a flow path of a lesser flow circulating area of the input line and the output line, the input U-shaped section, the output U-shaped section, and the component located between connection points defined between the anti-siphon line and the input and output lines.

2. The aircraft engine of claim 1, wherein the valve is located on the output line.

3. The aircraft engine of claim 1, wherein the valve is one of two valves, each of the two valves fluidly connected to a respective one of the input line and the output line.

4. The aircraft engine of claim 3, wherein each of the two valves is located between the component and a respective one of the input U-shaped section and the output U-shaped section.

5. The aircraft engine of claim 3, wherein the two valves are located closer to the component than the connection points of the anti-siphon line.

6. The aircraft engine of claim 1, wherein the component is an air-cooled oil cooler.

7. The aircraft engine of claim 1, wherein the flow circulating area of the anti-siphon line is selected such that a pressure drop of an oil flow through the anti-siphon line while the aircraft engine is running is greater than a pressure drop through the component.

8. The aircraft engine of claim 7, wherein the flow circulating area of the anti-siphon line is at most 5% of that of the input and output lines.

9. The aircraft engine of claim 1, wherein the anti-siphon line is connected to both of the input line and the output line at respective input and output connection points, a distance along a direction perpendicular to a ground between each of the input and output connection points and a respective one of lowest points of the input and output U-shaped sections being at least three times a diameter of a respective one of the input and output lines.

10. An oil system for an aircraft engine, comprising:

a component located above a central axis of the aircraft engine, the component containing a volume of oil during operation of the aircraft engine, the component having an inlet and an outlet;

an oil circuit fluidly connected to the component, the oil circuit including an input line fluidly connected to the inlet and an output line fluidly connected to the outlet, the input line defining an input U-shaped section, the output line defining an output U-shaped section;

a valve fluidly connected on the input line or the output line, the valve located between the component and a respective one of the input U-shaped section and the output U-shaped section; and an anti-siphon line fluidly connecting the input line to the output line while bypassing the input U-shaped section and the output U-shaped section, a flow circulating area of the anti-siphon line being less than that of the input line and of the output line.

11. The oil system of claim 10, wherein the valve is located on the output line.

12. The oil system of claim 10, wherein the valve is one of two valves, each of the two valves being fluidly connected to a respective one of the input line and the output line.

13. The oil system of claim 12, wherein each of the two valves is located between the component and a respective one of the input U-shaped section and the output U-shaped section.

14. The oil system of claim 12, wherein the two valves are located closer to the component than the connection points of the anti-siphon line.

15. The oil system of claim 10, wherein the component is an air-cooled oil cooler.

16. The oil system of claim 10, wherein the flow circulating area of the anti-siphon line is selected such that a pressure drop of an oil flow through the anti-siphon line while the aircraft engine is running is greater than a pressure drop through the component.

17. The oil system of claim 16, wherein the flow circulating area of the anti-siphon line is at most 5% of that of the input and output lines.

18. The oil system of claim 10, wherein the anti-siphon line is connected to both of the input line and the output line at respective input and output connection points, a distance along a direction perpendicular to the central axis between each of the input and output connection points and a respective one of lowest points of the input and output U-shaped sections being at least three times a diameter of a respective one of the input and output lines.

* * * * *